Figure 5:
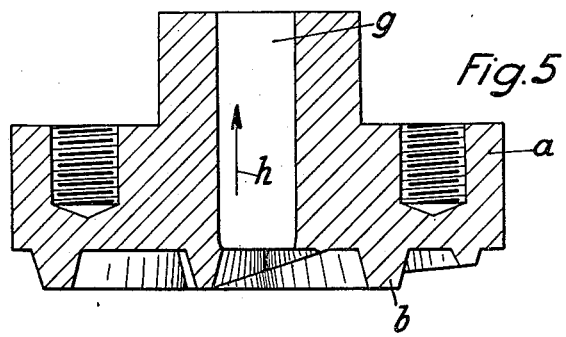

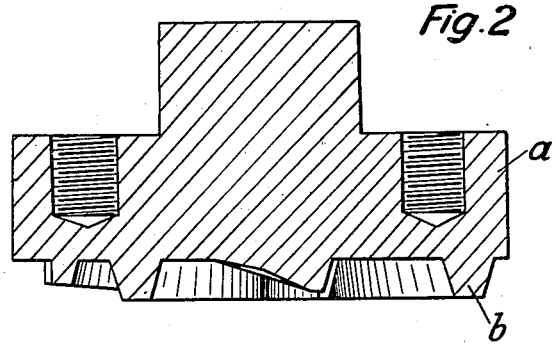
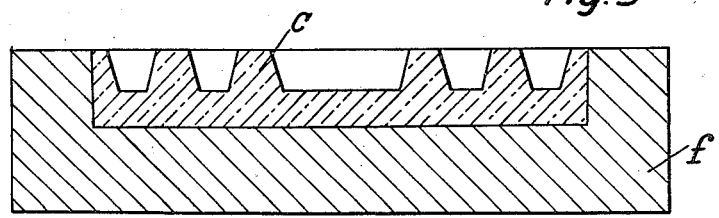
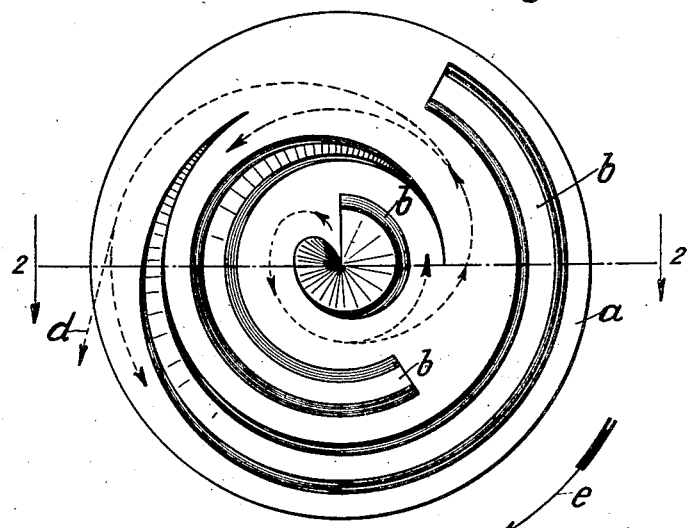

Inventor
MAX MICHEL
By
Attorney

Aug. 30, 1932.                M. MICHEL                1,875,175
APPARATUS FOR PRESSING ARTICLES FROM CERAMIC MATERIALS
                    Filed Nov. 21, 1930      3 Sheets-Sheet 3
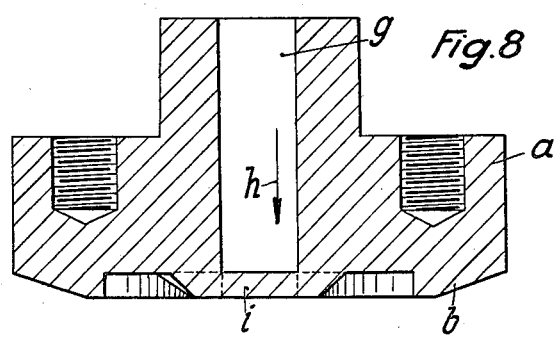
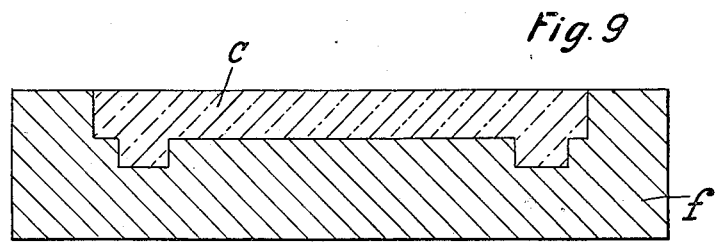
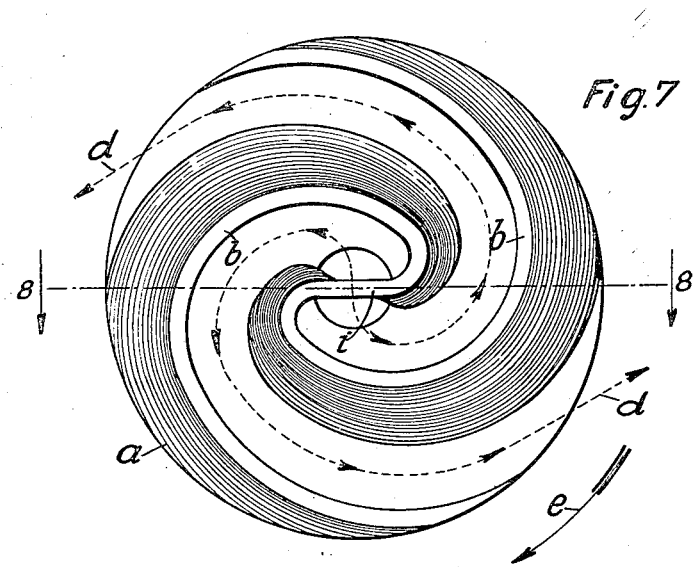
Inventor
MAX MICHEL
By
Attorney Patented Aug. 30, 1932

1,875,175

UNITED STATES PATENT OFFICE

MAX MICHEL, OF FREIBERG, GERMANY, ASSIGNOR TO PORZELLANFABRIK KAHL ZWEIGNIEDERLASSUNG FREIBERG, OF FREIBERG, GERMANY

APPARATUS FOR PRESSING ARTICLES FROM CERAMIC MATERIALS

Application filed November 21, 1930, Serial No. 497,318, and in Germany November 22, 1929.

My invention relates to a process of molding or pressing articles from a ceramic material and to a mold for carrying out such process.

If articles produced from plastic and particularly ceramic masses are not to be liable to distortion or breakage during baking or drying it is necessary that their mass shall be homogeneous and that no divergent tensions in the masses should be present. In order to attain this object, it is customary to subject ceramic masses to be molded on a lathe or otherwise to a preparatory manual rotary kneading treatment prior to the molding proper. In the process of pressing articles from relatively large ceramic bodies, however, the homogenizing and the equalization of the tensional stresses offer particular difficulties since the pressure exerted on the material in the mold will destroy the preceding homogenization or a previously established equalization of the tensions. This is due to the fact that during compression the mass is moved radially to the centre of the matrix and consequently becomes unequal in its different portions. Nor does the rotation of matrix and pressure die relatively to one another offer a remedy as by this method also a thorough kneading of the mass is not attained to the desired extent. Particularly difficult is the pressing of bodies with highly profiled surfaces as the curves and projections are apt to enhance the inequalities of the mass.

The object of my invention is to overcome these disadvantages.

I have found that superior results are obtained by causing the material during the pressing process to pass through an operation similar to that which is effected in molding rotating bodies with the molding wheel. The mass is therefore firmly kneaded during the molding by the pressure tool and consequently homogenized as well as freed from obnoxious tensions.

To this end the pressure die and the matrix which constitute the mold and during the pressing process perform a rotary movement relatively to one another, are provided either both or individually with one or several way spirals or spiral shaped kneading projections. These spirals knead the mass during the pressing operation and force it to move along spiral paths instead of in radial directions thereby effecting a homogenization of the mass and an equalization of the tensions.

The profile of the kneading spirals is preferably reduced or flattened towards the inlet side, that is to say, at the point where the spirals enter the mass when the mold sections are pressed upon one another so that the spirals do not encounter the material suddenly, but work their way into it gently. The mass is thereby not molded suddenly but is gradually conducted into the requisite paths.

In the accompanying drawings three constructional examples of rotary molding tools for carrying out my novel process are illustrated in which I have arranged spirals on the pressure die. In the dies shown the spiral kneading projections are in one plane but they could be arranged also on dies or matrices, the basic shapes of which are curved, oblique or vertical or terminate in shapes which are a combination thereof.

Figure 6:
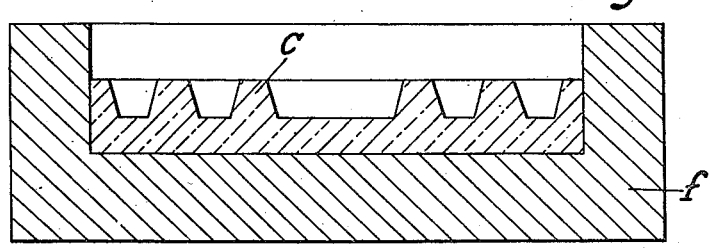
Figure 4:
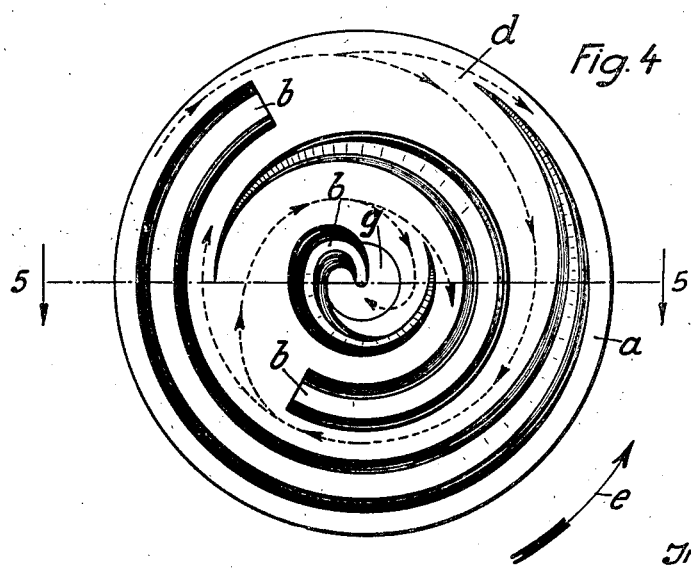

Figs. 1, 4 and 7 are a plan view on the internal face of the die or upper mold section, Figs. 2, 5 and 8 illustrate a diametrical section through the die shown in Figs. 1, 4, or 7 respectively, and Figs. 3, 6 and 9 represent the matrices including the molded ceramic bodies which are adapted to cooperate with the dies shown in the other figures.

The die $a$ is carried by a suitable machine (not shown) similar to a boring machine which imparts a rotation to the die about its axis and at the same time permits the operator to lower the die on and into the stationary mold $f$ arranged on a suitable support and charged with the requisite quantity of the ceramic material, e. g. porcelaine mass indicated at $c$.

Figs. 1 and 2 show a die or mold section provided with spiral shaped projections $b$ which rotates in the direction of the arrow $e$ and will move the mass spirally from inward to outward along the line $d$.

In the tools shown in Figs. 4, 5 and 6 the kneading spirals $b$ are such as to cause the flow of the mass in the direction of the arrow d from outward to inward. The tool itself rotating in the direction of the arrow e. The matrix f is again charged with the mass and may be so shaped that its edges project above the molded object c. For the purpose of discharging the excess of substance, the molding tool a is provided with a central bore g, by way of which the mass may escape in the direction of the arrow h. The innermost kneading spiral b is extended into the centre of the bore g.

With forms of the pressed body other than those shown it may be desirable for the purpose of removing the excess of substance to provide several bores g. These bores may be arranged either centrally or eccentrically and may be either in the pressure die or in the matrix or in both.

According to Figs. 7, 8 and 9 which show a tool with a two-way spiral b, the central bore g in the pressure die is used for the introduction of the mass in the direction of the arrow h, the spirals b during rotation of the tool a moving the mass from inward to outward in the direction d. The matrix f according to Fig. 9 need in this case not be charged with the mass c. In this arrangement the kneading spirals terminate centrally in the web i which bridges the central opening for the purpose of attaining a smooth surface on the article c. As regards the number and place of the bores in the die and in the matrix the same applies as stated in the preceding paragraph.

The supply or removal of the mass by way of bores in the die or matrix prevents the occurrence of pressures in the mass which counteract the kneading of the mass by the spiral shaped projections. These bores are therefore of particular importance when used in dies or matrices with kneading spirals.

For pressed objects which are to receive a profiled surface the kneading spirals must be shaped according to the relief and sunk portions of the surface.

What I claim is:—

1. Apparatus for forming articles from a ceramic material consisting of relatively rotatable sections in which at least one of said sections is formed with a spiral shaped kneading projection and provided with a boring for feeding material to or from the apparatus.

2. Apparatus for forming homogeneous bodies from plastic material, comprising relatively rotatable die and matrix members, a plurality of disconnected ridges on one of said members, said ridges being spiral, the inner sides of each ridge being defined by a circle having a radius greater than the radius to any point on the inwardly adjacent ridge, the outer edges of said ridges being defined by spirals whose radii increase in a direction counter to the direction of rotation.

3. Apparatus for forming homogeneous bodies from ceramic material, comprising a stationary matrix, a die member rotatable with respect to said matrix, said die member having a central opening through which material may be fed to or extruded from said apparatus, the internal face of said die being substantially flat and having spiral shaped kneading projections thereon, said spiral projections decreasing in width and height in the direction of rotation of the die member.

In testimony whereof I affixed my signature.

MAX MICHEL.